United States Patent
Churoux

[11] Patent Number: 5,988,615
[45] Date of Patent: Nov. 23, 1999

[54] DEVICE FOR FIXING AN OBJECT TO THE EDGE OF A FLAT SUPPORT

[75] Inventor: Patrice Churoux, Venteuil, France

[73] Assignee: Virax S.A., France

[21] Appl. No.: 09/036,837

[22] Filed: Mar. 9, 1998

[30] Foreign Application Priority Data

Jul. 2, 1997 [EP] European Pat. Off. .............. 97440054

[51] Int. Cl.[6] ........................................................ B25B 1/00
[52] U.S. Cl. .................................. 269/3; 269/6; 269/166;
269/254 R; 269/221; 269/236; 269/47;
269/97
[58] Field of Search ..................................... 269/236, 239,
269/166, 169, 167, 164, 196, 3, 6, 47, 147–149,
97, 98, 50, 254 R, 254 CS, 221

[56] References Cited

U.S. PATENT DOCUMENTS

| 1,850,178 | 1/1932 | McChesney . | |
|---|---|---|---|
| 4,202,540 | 5/1980 | Neff ........................................ | 269/166 |
| 5,265,854 | 11/1993 | Whiteford . | |

FOREIGN PATENT DOCUMENTS

| 350705 | of 1928 | Belgium . |
|---|---|---|
| 707152 | 4/1996 | European Pat. Off. . |
| 979161 | 4/1951 | France . |
| 1006251 | 4/1952 | France . |
| 8702315 | 4/1987 | Germany . |
| 910918 | 11/1962 | United Kingdom . |

*Primary Examiner*—Robert C. Watson
*Attorney, Agent, or Firm*—Ostrolenk, Faber, Gerb & Soffen, LLP

[57] ABSTRACT

A device for fixing an object to the edge of a flat support, the support having a top face on which the object is to be fixed and a lower face. A vertical section piece, positionable close to the edge of the support, is perpendicular to the plane of the support. The upper end of the section piece has an element which engages and holds the object on the top face of the support, e.g. rods projecting into a cavity in the object. An arm extending perpendicular to the section piece supports at one end thereof a cam for being selectively moved to press against and released from pressing against the lower face of the support. The section piece passes through an opening in the arm and the arm with the cam thereon is tiltable with reference to the section piece for locking the arm along the section piece. A lever then rotates the cam to press against the lower face of the support.

11 Claims, 2 Drawing Sheets

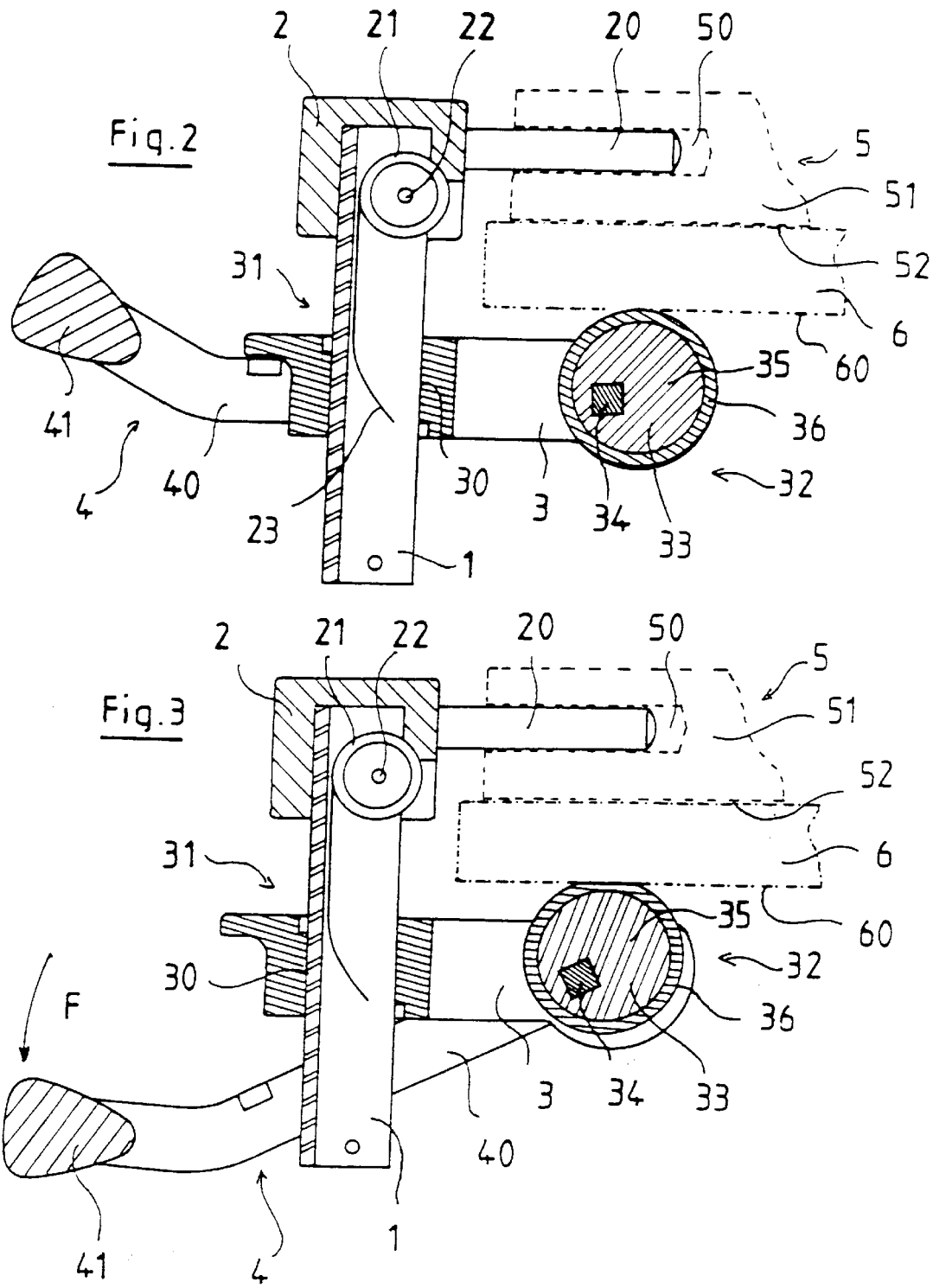

DEVICE FOR FIXING AN OBJECT TO THE EDGE OF A FLAT SUPPORT

BACKGROUND OF THE INVENTION

The present invention concerns a device for fixing an object to the edge of a flat support, especially for fixing a tool of a vise or similar type to a workbench.

Tools of the vise type are traditionally either permanently or removably secured to a flat support.

In the former case, the tool is secured by being screwed directly to the workbench, possibly via a turntable that allows the tool to be rotated. This kind of device is more particularly reserved for large tools and fixed set-ups, in a workshop for example. In the latter case, the tool has a clamp at its bottom which is intended to grip the edge of the workbench and a screw is tightened against the lower face of the bench. This kind of device is more particularly reserved for mobile worksites, especially when the workbench is small, and does not permit the vise to remain permanently attached.

This kind of device has a drawback of not allowing the tool to be attached immediately, as it is necessary, after having unscrewed the screw from the clamp, to adjust the openness of the clamp to suit the thickness of the support, then to tighten the screw. This sometimes creates the risk of damaging the lower face of the support.

It is sometimes necessary either to alter the position of the tool on the workbench or to remove the tool and replace it by another tool, suitable for a different kind of work.

SUMMARY OF THE INVENTION

The object of the present invention is to overcome the above drawbacks by providing a device for fixing an object to the edge of a flat support, which allows quick and immediate securing.

The device of the present invention comprises a section piece which is intended to be positioned close to the edge of the support to which the object is to be fixed and the section piece is perpendicular to the plane of the support. The upper end of the section piece has means like rods that allow it to be secured to the object. The section piece is inserted, with the possibility of sliding, in an opening made in one end of an arm that extends perpendicular to the section piece and that extends parallel to and faces the lower face of the support. The other end of the arm has a cam with a boss, and when the cam is pivoted by a lever, that presses the boss of the cam against the lower face of the support.

As an additional feature, the means of securing the object comprises at least one component that extends at right angles to the section piece and is intended to fit tightly in a cavity of a complementary shape in the object, or to cover part of the object.

As another feature, the arm is returned elastically by a spring, toward the upper end of the section piece. When the lever tilts the arm and also turns the cam, the arm is locked against shifting vertically by canting and contacting the section piece. The cam presses on the lower face of the support.

In a further feature of the invention, a stirrup shaped component is positioned so that it straddles the cam and is held by the spindle about which the cam pivots with a possibility for radial translation with respect to the spindle, at right angles to the arm. This component has a flat part tangential to the cam below it. The outer face of the flat part of the component is intended to contact the lower face of the support.

Other features and advantages of the present invention will become apparent from the following description of the invention which refers to the accompanying drawings.

BRIEF DESCRIPTION OF THE DRAWINGS

FIG. 2 shows a view in section on a vertical mid-plane of the same device, during the fixing of an object.

FIG. 3 shows the same view when the object has been fixed.

DETAILED DESCRIPTION OF THE INVENTION

Figure 1:
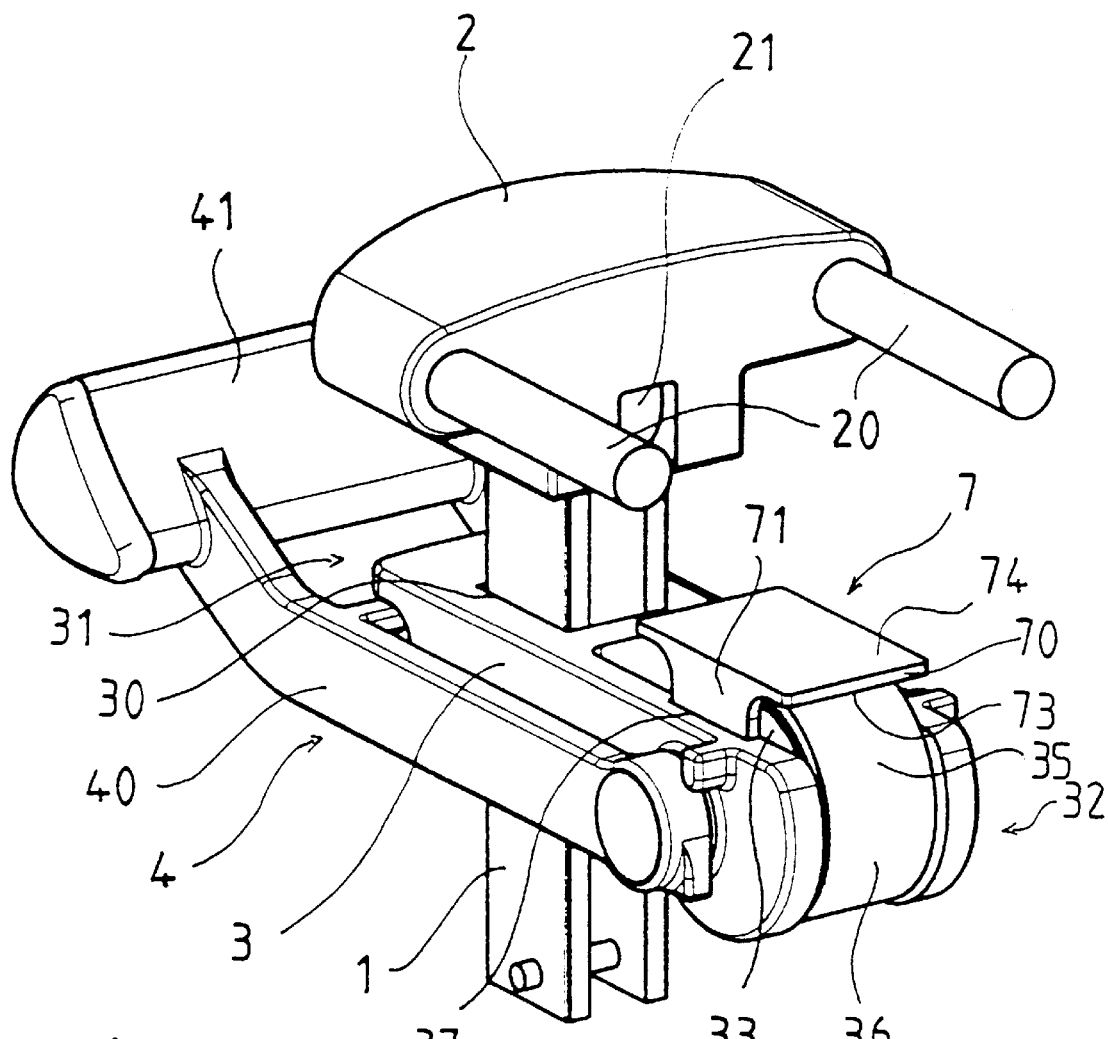
FIG. 1 shows a perspective view of the fixing device according to the invention.

FIG. 1 shows a device for fixing a tool to a flat support, which comprises a section piece 1 of U-shaped cross section, oriented vertically. A body 2 is secured to the upper end of the piece 1. Two parallel rods 20 project at right angles from the body 2 for being received in or on the tool to be supported. Other shape clamping elements may be used.

The section piece 1 is mounted slidably in an opening 30 in one end region 31 of an arm 3. The arm 3 is oriented transversely to and particularly perpendicular to the section piece 1 as it is opposed to and is spaced from the rods 20.

The other end 32 of the arm 3 comprises a cam 33 that can be pivoted via a lever 4 that has two branches 40, which pass by respective sides of the arm 3. The opposite ends of the branches of the lever are secured to a handle 41.

FIG. 2 shows that the cam 33 is connected to the lever 4 via a square or profiled connector 34, which is mounted in hubs, not shown, mounted in the lever 4 such that the cam and the lever can rotate together.

The arm 3 is returned elastically toward the body 2 by a flat coil spring 21 housed in the body 2 inside the section piece 1 and mounted on a spindle 22. The end 23 of the spring is secured to the arm 3 inside the opening 30 by appropriate means.

The invention is used as follows. The parallel rods 20 are inserted into passages 50 made in the base 51 of the tool 5 which rests via its lower face 52 on a generally flat support 6 which is in or at least generally in a plane. The arm 3 is engaged under the support 6.

Under the bias exerted by the spring 21, the arm 3 travels up the section piece 1 until the cam 33 comes into contact with the lower face 60 of the flat support 6. This contact tilts the arm 3 with respect to the section piece 1 sufficiently to secure the arm in position along the piece 1.

In FIG. 3, pushing the lever 4 down in the direction of the arrow F pivots the cam 33 such that its boss 35 bears on the lower face 60 of the flat support 6. This moves the end 32 of the already tilted arm 3 even further away from the lower face 60 of the support 6 while the other end 31 of the arm tilts to contact and jam against the section piece 1. This locks the arm 3 in its position along the length of the section piece 1 and allows the tool 5 and flat support 6 to be clamped.

The cam 33 is covered on its periphery with a roller 36 that can turn freely on the cam 33, allowing the position of the cam to be stabilized during the clamping.

Figure 4:
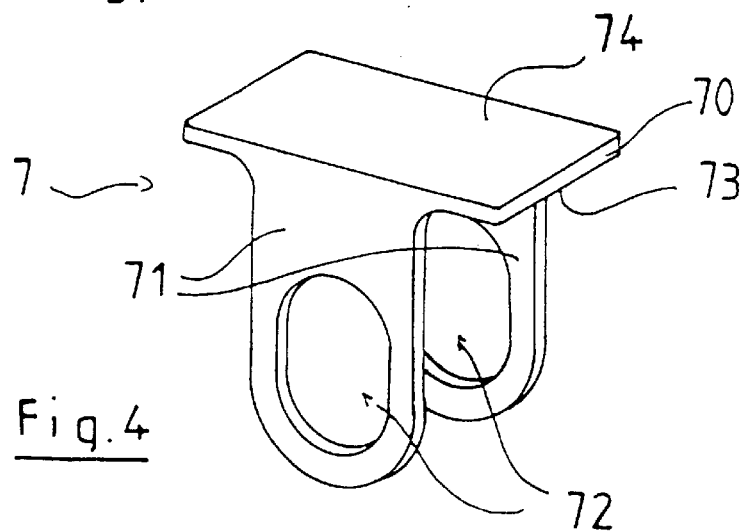
FIG. 4 shows a perspective view of an element of an alternative form of the same device.

FIG. 4 shows a component 7 comprising a flat middle part 70 and two parallel legs 71 which are at right angles to the part 70. Each leg has an oblong hole 72 in it.

As depicted in FIG. 1, the component 7 is intended to be positioned straddling the outward side surfaces of the cam 33. The spindle, not visible, about which the cam pivots, passes through the holes 72, with the legs 71 sitting in grooves 37 made in the arms 3, to allow for radial translation of the component.

When the lever 4 is operated, the cam 33 bears against the lower face 73 of the part 70, while the upper face 74 of this part is pressed against the lower face 60 of the flat support 6. This better spreads the load. The upper face 74 of the part 70 may advantageously be coated with a non-slip material.

In an alternative form of the invention, the rods 20 are replaced by one or more jaws intended to cover part of the object to be fixed to the flat support.

The device according to the invention is essentially intended for fixing tools of a vise or similar type to a workbench. But, it can also be used for fixing other tools, such as cutting tools for example, or it may alternatively be used for fixing objects by being used as a hold down clamp.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for fixing an object to the edge of a support, the support having an upper face on which the object is to be positioned and having a lower face; the device comprising:

a section piece for being positioned near to the edge of the support to which an object is to be fixed and the section piece being oriented at least generally perpendicular to the general plane of the support;

securing means on the section piece above the support and shaped and positioned for engaging the object to be fixed on the support;

an arm extending from the section piece transverse to the section piece, the arm is generally parallel to, spaced below and faces toward the lower face of the support; the arm being tiltable with respect to the section piece to selectively lock the arm against moving along the section piece or to be free to move along the section piece; the arm has an opening therein, the section piece passes through the opening in the arm, the opening being sized such that the arm can move along the section piece and such that the section piece engages the arm upon the arm being tilted;

a cam rotatably supported on the arm, the cam including a periphery shaped so that as the cam is rotated on the arm, the cam presses selectively increasingly or decreasingly against the lower face of the support, the arm is movable selectively to press the cam against the lower face of the support and to move the cam off the lower face of the support;

a swingable lever connected with the cam, the lever being swingable for selectively rotating the cam on the arm to increasingly press the cam against the lower face of the support or to decrease the pressing against the lower face of the support;

a spring for normally biasing the arm upward along the section piece and toward the lower face of the support.

2. The device of claim 1, wherein the securing means for fixing an object at the support comprises a component extending from the section piece toward the object for engaging the object.

3. The device of claim 2, wherein the securing means further comprises the object having a cavity therein of a shape complementary to the shape of the component extending from the section piece, so that the component may fit into the cavity to engage and secure the object of the support.

4. The device of claim 3, wherein the component extends at a right angle from the section piece to the object.

5. The device of claim 1, wherein the spring comprises:

a flat coil spring in the section piece and a spindle on the section piece on which the coil spring is wound, the spring spindle being oriented so that the coil spring retracts to draw the arm upwardly along the section piece;

the coil spring having an end which is secured to the arm, such that retraction of the coil spring moves the arm upwardly toward the top of the section piece.

6. The device of claim 5, wherein the end of the spring is secured to the arm inside the opening through the arm.

7. A device for fixing an object to the edge of a support, the support having an upper face on which the object is to be positioned and having a lower face; the device comprising:

a section piece for being positioned near to the edge of the support to which an object is to be fixed and the section piece being oriented at least generally perpendicular to the general plane of the support;

securing means on the section piece above the support and shaped and positioned for engaging the object to be fixed on the support;

an arm extending from the section piece transverse to the section piece, the arm is generally parallel to, spaced below and faces toward the lower face of the support; the arm being tiltable with respect to the section piece to selectively lock the arm against moving along the section piece or to be free to move along the section piece; the arm has an opening therein, the section piece passes through the opening in the arm, the opening being sized such that the arm can move along the section piece and such that the section piece engages the arm upon the arm being tilted;

a cam on the arm, the arm is movable selectively to press the cam against the lower face of the support and to move the cam off the lower face of the support;

the cam having a periphery, a roller around the periphery of the cam that can turn freely on the cam and the roller being the part of the cam for engaging the lower face of the support.

8. A device for fixing an object to the edge of a support, the support having an upper face on which the object is to be positioned and having a lower face; the device comprising:

a section piece for being positioned near to the edge of the support to which an object is to be fixed and the section piece being oriented at least generally perpendicular to the general plane of the support;

securing means on the section piece above the support and shaped and positioned for engaging the object to be fixed on the support;

an arm extending from the section piece transverse to the section piece, the arm is generally parallel to, spaced below and faces toward the lower face of the support; the arm being tiltable with respect to the section piece to selectively lock the arm against moving along the section piece or to be free to move along the section piece; the arm has an opening therein, the section piece passes through the opening in the arm, the opening being sized such that the arm can move along the section piece and such that the section piece engages the arm upon the arm being tilted;

a cam on the arm, a pivot on the arm about which the cam pivots; the arm is movable selectively to pivot the cam and press the cam against the lower face of the support and to move the cam off the lower face of the support;

a generally stirrup shaped component including legs that straddle the cam and the cam pivot, with the stirrup shaped component including an opening at the cam spindle for permitting radial translation of the component with respect to the cam pivot perpendicular to the arm;

the stirrup shaped component having a flat part with an outer face that rests against the lower face of the support, and the cam engaging the opposite surface of the flat part of the component for urging the outer face thereof against the lower face of the support.

9. The device of claim 8, wherein the upper face of the flat part of the component is coated with a non-slip material.

10. The device of claim 1, further comprising the lever extending from the cam located at the lower face of the support to a part of the lever beyond the section piece, whereby the lever is operable at the part of the lever not under the lower face of the support.

11. A device for fixing an object to the edge of a support, the support having an upper face on which the object is to be positioned and having a lower face; the device comprising:

a section piece for being positioned near to the edge of the support to which an object is to be fixed and the section piece being oriented at least generally perpendicular to the general plane of the support;

securing means on the section piece above the support and shaped and positioned for engaging the object to be fixed on the support;

an arm extending from the section piece transverse to the section piece, the arm is generally parallel to, spaced below and faces toward the lower face of the support; the arm being tiltable with respect to the section piece to selectively lock the arm against moving along the section piece or to be free to move along the section piece; the arm has an opening therein, the section piece passes through the opening in the arm, the opening being sized such that the arm can move along the section piece and such that the section piece engages the arm upon the arm being tilted;

a cam on the arm, the arm is movable selectively to press the cam against the lower face of the support and to move the cam off the lower face of the support;

a swingable lever connected with the cam, the lever extending from the cam located at the lower face of the support to a part of the lever beyond the section piece, whereby the lever is operable at the part of the lever not under the lower face of the support, the lever being swingable for selectively moving the cam to press against the lower face of the support or away from pressing against the lower face of the support;

a spring for normally biasing the arm upward along the section piece and toward the lower face of the support.

\* \* \* \* \*